United States Patent
Lei

(10) Patent No.: US 12,418,886 B2
(45) Date of Patent: Sep. 16, 2025

(54) METHOD AND APPARATUS FOR DETERMINING PAGING CARRIER, PAGING METHOD AND APPARATUS, STORAGE MEDIUM, TERMINAL AND BASE STATION

(71) Applicant: SPREADTRUM SEMICONDUCTOR (NANJING) CO., LTD., Jiangsu (CN)

(72) Inventor: Zhenzhu Lei, Shanghai (CN)

(73) Assignee: SPREADTRUM SEMICONDUCTOR (NANJING) CO., LTD., Jiangsu (CN)

( * ) Notice: Subject to any disclaimer, the term of this patent is extended or adjusted under 35 U.S.C. 154(b) by 415 days.

(21) Appl. No.: 18/018,659

(22) PCT Filed: Jul. 30, 2021

(86) PCT No.: PCT/CN2021/109521
§ 371 (c)(1),
(2) Date: Jan. 30, 2023

(87) PCT Pub. No.: WO2022/022671
PCT Pub. Date: Feb. 3, 2022

(65) Prior Publication Data
US 2023/0300792 A1     Sep. 21, 2023

(30) Foreign Application Priority Data
Jul. 31, 2020   (CN) .......................... 202010762397.3

(51) Int. Cl.
*H04W 24/10* (2009.01)
*H04W 68/02* (2009.01)
*H04W 76/28* (2018.01)

(52) U.S. Cl.
CPC ........... *H04W 68/02* (2013.01); *H04W 24/10* (2013.01); *H04W 76/28* (2018.02)

(58) Field of Classification Search
CPC ..... H04W 68/02; H04W 24/10; H04W 76/28; H04W 68/00; Y02D 30/70
See application file for complete search history.

(56) References Cited

U.S. PATENT DOCUMENTS 8,855,034 B2    10/2014   Park et al.
10,582,473 B2    3/2020   Marco
(Continued)

FOREIGN PATENT DOCUMENTS

CN    107666709 A    2/2018
CN    107734687 A    2/2018
(Continued)

OTHER PUBLICATIONS

International Search Report for International Application No. PCT/CN2021/109521; Date of Mailing, Nov. 3, 2021.
(Continued)

*Primary Examiner* — Chuong A Ngo
(74) *Attorney, Agent, or Firm* — CANTOR COLBURN LLP

(57) ABSTRACT

A method and apparatus for determining a paging carrier, a paging method and apparatus, a storage medium, a terminal and a base station are provided. The method for determining the paging carrier includes: determining a target carrier group based on a User Equipment (UE) identity, paging weights of a plurality of carrier groups and common paging parameters, wherein the common paging parameters correspond to the plurality of carrier groups, and each of the plurality of carrier groups is configured with a paging weight; and selecting the paging carrier from the target carrier group at least based on a current coverage level and/or measured channel quality.

20 Claims, 3 Drawing Sheets

(56) References Cited

U.S. PATENT DOCUMENTS

| | | | |
|---|---|---|---|
| 2019/0166578 A1 | 5/2019 | Chang et al. | |
| 2019/0239051 A1 | 8/2019 | Hwang et al. | |
| 2019/0342852 A1* | 11/2019 | Marco | H04W 68/02 |
| 2019/0349889 A1 | 11/2019 | Lu et al. | |
| 2020/0100208 A1* | 3/2020 | Vaidya | H04W 68/02 |
| 2022/0007392 A1 | 1/2022 | Chang et al. | |

FOREIGN PATENT DOCUMENTS

| | | |
|---|---|---|
| CN | 108353384 A | 7/2018 |
| CN | 110139364 A | 8/2019 |
| CN | 111132328 A | 5/2020 |
| WO | 2020151328 A1 | 7/2020 |

OTHER PUBLICATIONS

Sharp, Discussion on opaging in eNB-IoT; 3GPP TSG-RAN WG2#95Bis; R2-166437; Oct. 10-14, 2016; 4 pages.

EPO Extended European Search Report for corresponding EP Application No. 21850129.4; issued Dec. 20, 2023; 6 pages.

ZTE, "Consideration for paging on multi-carrier in NB-IoT"; 3GPP TSG-RAN WG2 Meeting#95; R2-164858; Gothenburg, Sweden, Aug. 22-26, 2016; 3 pages.

\* cited by examiner

METHOD AND APPARATUS FOR DETERMINING PAGING CARRIER, PAGING METHOD AND APPARATUS, STORAGE MEDIUM, TERMINAL AND BASE STATION

CROSS-REFERENCE TO RELATED APPLICATIONS

This is the U.S. national stage of application No. PCT/CN2021/109521, filed on Jul. 30, 2021. Priority under 35 U.S.C. § 119(a) and 35 U.S.C. § 365(b) is claimed from Chinese Application No. 202010762397.3, filed Jul. 31, 2020, the disclosure of which is also incorporated herein by reference.

TECHNICAL FIELD

The present disclosure generally relates to communication technology field, and more particularly, to a method and apparatus for determining a paging carrier, a paging method and apparatus, a storage medium, a terminal and a base station.

BACKGROUND

In existing standards, a Narrow Band Internet of Things (NB-IoT) terminal can uniquely determine a carrier for paging monitoring based on a User Equipment Identity (UE_ID) and parameters broadcast by a network in combination with a specific formula. In the future, NB-IOT will introduce carrier-level paging parameter configuration, that is, different carriers will have different paging parameter configurations.

SUMMARY

Embodiments of the present disclosure enable to select a carrier corresponding to appropriate paging parameter configuration for paging monitoring based on an actual situation of a UE itself, to improve working efficiency of an NB-IOT system.

In an embodiment of the present disclosure, a method for determining a paging carrier is provided, including: determining a target carrier group based on a UE identity, paging weights of a plurality of carrier groups and common paging parameters, wherein the common paging parameters correspond to the plurality of carrier groups, and each of the plurality of carrier groups is configured with a paging weight; and selecting the paging carrier from the target carrier group at least based on a current coverage level and/or measured channel quality.

In an embodiment of the present disclosure, a storage medium having computer instructions stored therein is provided, wherein when the computer instructions are executed by a processor, the above method is performed.

In an embodiment of the present disclosure, a terminal including the above apparatus for determining the paging carrier or including a memory and a processor is provided, wherein the memory has computer instructions stored therein, and when the processor executes the computer instructions, the above method for determining the paging carrier is performed.

DETAILED DESCRIPTION

Figure 1:
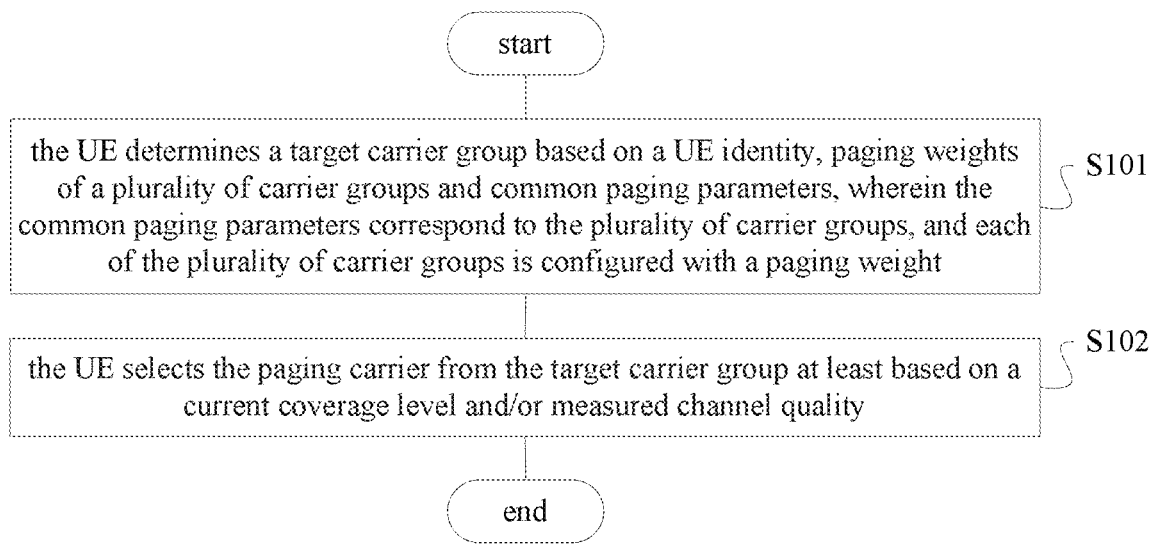
FIG. 1 is a flow chart of a method for determining a paging carrier according to an embodiment.

As an NB-IoT single-frequency cell has only a bandwidth of 180 kilohertz (kHz), except overhead for Narrow Bandwidth Primary Synchronization Signal (NPSS) and Narrow Bandwidth Secondary Synchronization Signal (NSSS) of NB-IoT and System Information Block (SIB), remaining traffic channel capacity is very small.

To support a large number of terminals, it is necessary to use multiple frequency points to increase network capacity. In addition to anchor carriers including NPSS, NSSS and Narrow Bandwidth Physical Broadcast Channel (NPBCH), the cell may also include several non-anchor carriers not including NPSS, NSSS and NPBCH.

That is to say, a cell may include an anchor carrier and several non-anchor carriers, where a spectrum bandwidth of each carrier is 180 kHz, and a maximum spectrum span of all carriers in the cell does not exceed 20 megahertz (MHz).

The anchor carrier means that there is merely one downlink carrier in a multi-carrier cell, and supports simultaneously carrying NPSS, NSSS, NPBCH, Narrow Bandwidth Physical Downlink Control Channel (NPDCCH) and Narrow Bandwidth Physical Downlink Shared Channel (NPDSCH). The UE needs to monitor NPSS, NSSS, and information transmitted on NPBCH, NPDCCH and NPDSCH on the anchor carrier.

Further, in a multi-carrier cell, there may be several downlink carriers that merely carry NPDCCH and NPDSCH, but do not carry NPSS, NSSS and NPBCH, which are called non-anchor carriers. The UE may perform data transmission on the non-anchor carriers.

In addition, before the UE enters a connected state, the network may designate a carrier for subsequent downlink data transmission through Msg4 in a random access procedure. The UE in an idle state can monitor paging on the non-anchor carriers.

In existing standards, the network transmits through system information parameter configuration information related to paging, including a paging cycle, a number of PDCCH repetitions corresponding to Paging Occasion (PO), a number N of Paging Frames (PF) included in each Discontinuous Reception (DRX) cycle and a number Ns of POs included in each paging frame.

According to the existing standards, the above parameters configured in the paging configuration information are at a cell level, that is, the paging parameter configurations of all the carriers in the cell are consistent. In addition, the network may also configure the paging weight of each carrier (including anchor carriers and non-anchor carriers).

When in the idle state, the UE may determine on which carrier the paging monitoring is performed based on a UE identity (UE_ID), parameters N and $N_s$, and the paging weights of the plurality of carrier groups in combination with the formula floor(UE_ID/($N \times N_s$))$_{mod}$ $W < W(0) + W(1) + \ldots + W(n)$. W is a sum of the paging weights of all carriers in the cell, W(0) is the paging weight corresponding to the carrier whose index number is 0, and so on. The carrier corresponding to the smallest index number n that satisfies the above formula is the carrier that receives paging.

Each UE can uniquely determine a paging carrier according to its own UE identity and parameters configured by the network.

To ensure coverage, NB-IOT adopts repeated transmission technology. A maximum number of repetitions for downlink transmission is 2048, and a maximum number of repetitions for uplink transmission is 128.

Existing paging carrier determination mechanism cannot enable the UE to select a paging carrier for paging monitoring according to its own actual situation.

An embodiment of the present disclosure provides a method for determining a paging carrier, including: determining a target carrier group based on a UE identity, paging weights of a plurality of carrier groups and common paging parameters, wherein the common paging parameters correspond to the plurality of carrier groups, and each of the plurality of carrier groups is configured with a paging weight; and selecting the paging carrier from the target carrier group at least based on a current coverage level and/or measured channel quality.

Embodiments enable to select a carrier corresponding to appropriate paging parameter configuration for paging monitoring according to the UE's own state and environment, which is conducive to improving working efficiency of an NB-IOT system. Specifically, by pre-configuring a plurality of carrier groups and configuring corresponding paging weights for each carrier group, the UE can uniquely determine a carrier group, i.e., the target carrier group (also referred to as a preferred carrier group), based on a UE identity, the paging weights of the plurality of carrier groups and relevant broadcasting parameters (such as common paging parameters). Further, after determining the target carrier group, the UE may select an appropriate carrier in the target carrier group as the paging carrier according to its own actual situation, and monitor paging on the paging carrier.

In order to clarify the objects, characteristics and advantages of the disclosure, embodiments of present disclosure will be described in detail in conjunction with accompanying drawings.

FIG. 1 is a flow chart of a method for determining a paging carrier according to an embodiment.

The method may be applied to a 5G system, such as a scenario of realizing paging configuration in a carrier level in NB-IOT.

The method may be performed by a UE side, such as by a UE on the UE side. The UE may be a UE capable of realizing paging configuration in a carrier level in the future.

In some embodiments, the method provided by following steps S101 and S102 may be performed by a chip with a paging function in the UE or by a baseband chip in the UE.

Specifically, referring to FIG. 1, the method in the embodiment may include S101 and S102.

In S101, the UE determines a target carrier group based on a UE identity, paging weights of a plurality of carrier groups and common paging parameters, wherein the common paging parameters correspond to the plurality of carrier groups, and each of the plurality of carrier groups is configured with a paging weight.

In S102, the UE selects the paging carrier from the target carrier group at least based on a current coverage level and/or measured channel quality.

In some embodiments, a network may configure a plurality of carrier groups which are equivalent. That is, a number of carriers included in each carrier group is the same, and the paging parameter configurations among the plurality of carrier groups are consistent.

Specifically, the paging parameter configurations among the plurality of carrier groups being consistent means that each carrier group has same non-common paging parameters, and these non-common paging parameters are assigned to specific carriers in each carrier group as required.

In some embodiments, the non-common paging parameters may be determined based on carrier-level paging parameter configuration.

Figure 2:
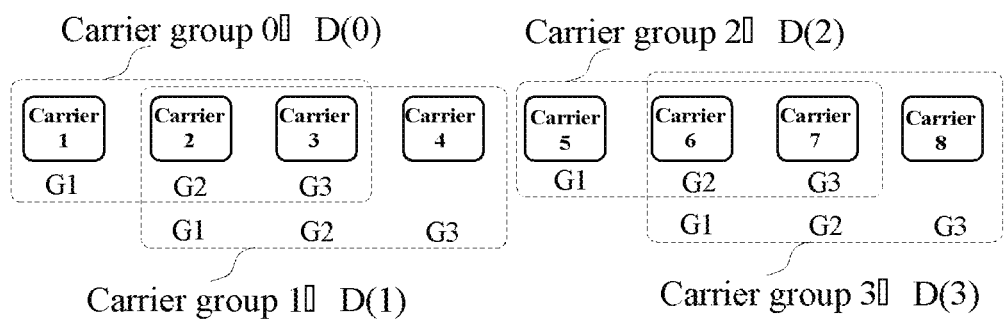
FIG. 2 is a diagram of carrier groups in a first application scenario according to an embodiment.

For example, referring to FIG. 2, the network configures 4 carrier groups, including carrier group 0, carrier group 1, carrier group 2, and carrier group 3. There are 3 carriers in each carrier group which correspond to non-common paging parameters G1, G2, and G3. Referring to FIG. 2, the paging parameter configuration among the carrier groups being consistent means that each of the four carrier groups has the same configuration, i.e., having three non-common paging parameters G1, G2 and G3.

In some embodiments, for each of the plurality of carrier groups, non-common paging parameters corresponding to at least a portion of carriers included in the carrier group are different from non-common paging parameters corresponding to other carriers in the carrier group. That is, carriers in a single carrier group may have different non-common paging parameter configurations.

Having different non-common paging parameter configurations means that the non-common paging parameters corresponding to the carriers in the carrier group are completely different, or partially the same and partially different.

For example, for a single carrier group, multiple carriers in the carrier group may correspond to different paging cycles, different numbers N of paging frames included in a single DRX cycle, different numbers $N_s$ of paging occasions included in a single paging frame, or different PDCCH repetition times.

For example, continuing to refer to FIG. 2, three carriers included in carrier group 0 correspond to non-common paging parameter configurations G1, G2, and G3 respectively, and specific values of one or more paging parameters of G1, G2, and G3 are different.

In some embodiments, the network may configure a paging weight for each carrier group.

For example, referring to FIG. 2, carrier group 0 corresponds to paging weight D(0), carrier group 1 corresponds to paging weight D(1), carrier group 2 corresponds to paging weight D(2), and carrier group 3 corresponds to paging weight D(3). Carriers in each carrier group are not additionally configured with paging weights.

In some embodiments, the network may configure for all the carrier groups partial common paging parameters for determining the target carrier group for paging a specific UE. Specifically, the common paging parameters correspond to all carrier groups of the cell. In other words, all the carrier groups may share the common paging parameter configuration, while carriers in each carrier group may correspond to different non-common paging parameters.

The common paging parameters are used for the network and the UE to determine the target carrier group, and the non-common paging parameters configured for each carrier in the carrier group are used for the UE to actually perform paging monitoring after selecting the carrier as the paging carrier.

For example, the common paging parameters may include a number N of paging frames included in a single DRX cycle, and a number $N_s$ of paging occasions included in a single paging frame.

For another example, the non-common paging parameters may include a paging cycle, PDCCH repetition times, and the like.

In some embodiments, there is carrier overlap between at least a portion of the plurality of carrier groups. That is, the same carrier may exist in different carrier groups.

For example, referring to FIG. 2, carrier group 0 may include carrier 1, carrier 2, and carrier 3, carrier group 1 may include carrier 2, carrier 3, and carrier 4, carrier group 2 may include carrier 5, carrier 6, and carrier 7, and carrier group 3 may include carrier 6, carrier 7, and carrier 8.

In some embodiments, for carriers overlapped among the plurality of carrier groups, the non-common paging parameters corresponding to the overlapped carriers in different carrier groups are different.

For example, referring to FIG. 2, carrier 2 corresponds to paging parameter configuration G2 in carrier group 0, and corresponds to non-common paging parameter configuration G1 in carrier group 1.

For another example, referring to FIG. 2, carrier 3 corresponds to paging parameter configuration G3 in carrier group 0, and corresponds to non-common paging parameter configuration G2 in carrier group 1.

For another example, referring to FIG. 2, carrier 6 corresponds to paging parameter configuration G2 in carrier group 2, and corresponds to non-common paging parameter configuration G1 in carrier group 3.

For another example, referring to FIG. 2, carrier 7 corresponds to paging parameter configuration G3 in carrier group 2, and corresponds to non-common paging parameter configuration G2 in carrier group 3.

Alternatively, there may be no carrier overlap among the plurality of carrier groups. That is, all carriers in the cell are pre-divided into the plurality of carrier groups, and each carrier merely belongs to one carrier group.

Figure 3:
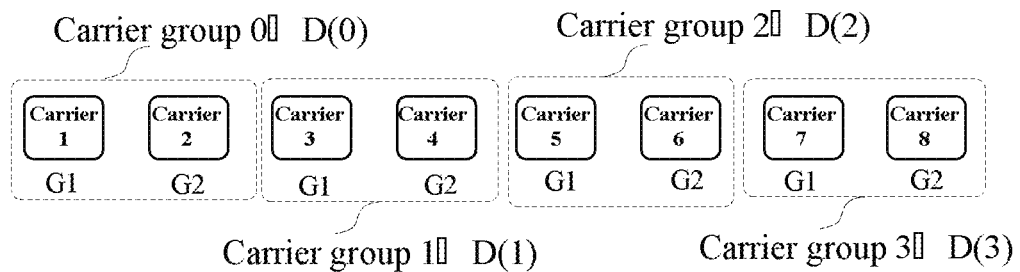
FIG. 3 is a diagram of carrier groups in a second application scenario according to an embodiment.

For example, referring to FIG. 3, assume that the network assigns 8 carriers in the cell to 4 carrier groups. Carrier group 0 includes carrier 1 and carrier 2, and corresponds to paging weight D(0), carrier 1 corresponds to non-common paging parameter configuration G1, and carrier 2 corresponds to non-common paging parameter configuration G2. Carrier group 1 includes carrier 3 and carrier 4, and corresponds to paging weight D(1), carrier 3 corresponds to non-common paging parameter configuration G1, and carrier 4 corresponds to non-common paging parameter configuration G2. Carrier group 2 includes carrier 5 and carrier 6, and corresponds to paging weight D(2), carrier 5 corresponds to non-common paging parameter configuration G1, and carrier 6 corresponds to non-common paging parameter configuration G2. Carrier group 3 includes carrier 7 and carrier 8, and corresponds to paging weight D(3), carrier 7 corresponds to non-common paging parameter configuration G1, and carrier 8 corresponds to non-common paging parameter configuration G2.

In some embodiments, the division of the carrier groups may be performed sequentially according to index numbers of the carriers, for example, one or more adjacent carriers belong to a same carrier group.

Alternatively, the network may arbitrarily select one or more appropriate carriers to form a carrier group according to an actual situation of the cell, no matter the one or more carriers are adjacent or not. For example, carrier 1 and carrier 3 illustrated in FIG. 2 may belong to carrier group 1, while carrier 2 and carrier 4 illustrated in FIG. 2 may belong to carrier group 2.

In some embodiments, the UE identity may be used to uniquely identify the UE. For example, the UE identity may be International Mobile Subscriber Identity (IMSI), or Serving-Temporary Mobile Subscriber Identity (S-TMSI).

In some embodiments, the carrier group in the embodiment may be equivalent to the carrier in existing technique. In the embodiments of the present disclosure, the paging weight is configured in units of carrier groups, and the network determines the target carrier group using the UE identity, the paging weight of each carrier group, and the common paging parameters, and page the UE on all carriers in the target carrier group.

Specifically, the network may pre-configure a carrier group list which includes indexes of the carrier groups and carriers included in each carrier group. The carrier group list may be included in the paging configuration information to be sent to the UE, so that the UE selects the target carrier group from the paging configuration information when performing S101.

Further, the carrier group list may also include paging weights corresponding to the plurality of carrier groups. Alternatively, the paging weights corresponding to the plurality of carrier groups may be indicated separately in the paging configuration information, such as indication in a one-to-one correspondence with the index of each carrier group.

Further, the carrier group list may also include non-common paging parameters of each carrier in the carrier group. Alternatively, the non-common paging parameters corresponding to the carriers may be indicated separately in the paging configuration information, such as indication in a one-to-one correspondence with the index of each carrier.

In some embodiments, the method may further include receiving paging configuration information, wherein the paging configuration information includes the common paging parameters and the paging weights corresponding to the plurality of carrier groups. Therefore, the UE can determine the target carrier group.

Specifically, the paging configuration information may be transmitted by broadcasting.

Further, the action of receiving the paging configuration information may be performed at any time after the UE accesses the cell.

Further, the paging configuration information may be carried by system information.

The carrier group in the embodiments may also be understood as a carrier list, that is, a group consisting of at least one carrier.

In some embodiments, the paging configuration information may further include channel quality thresholds and/or coverage levels corresponding to the carriers in the plurality of carrier groups. Accordingly, the UE may make selections according to signal quality thresholds and/or coverage levels corresponding to each carrier in the target carrier group, so as to select a carrier that matches its actual situation as the paging carrier.

For example, the channel quality thresholds include RSRP thresholds.

For another example, the channel quality thresholds include RSRQ thresholds.

In some embodiments, S101 may include: calculating a comparison value based on the UE identity, the paging weights of the plurality of carrier groups and the common paging parameters; and from a carrier group with a smallest index number among the plurality of carrier groups, accumulating the paging weight of the carrier group, and based on that an accumulated value is greater than the comparison value, determining that the carrier group corresponding to the last accumulated paging weight is the target carrier group.

Optionally, the comparison value is calculated based on a following formula:

$$X=\text{floor}(UE\_ID/(N \times N_s)) \bmod W,$$

where X is the comparison value, the floor( ) is a round-down function, UE_ID is the UE identity, N is a number of paging frames included in a single DRX cycle, $N_s$ is a number of paging occasions included in a single paging frame, W is a sum of the paging weights of the plurality of carrier groups, and mod is a modulo operation.

Further, N and $N_s$ may be common paging parameters indicated by the network to the UE in advance through broadcast or other means. For example, the network may pre-configure the number N of paging frames included in a single DRX cycle and the number $N_s$ of paging occasions included in a single paging frame through paging configuration information.

For example, referring to FIG. 2, W=D(0)+D(1)+D(2)+D(3). Further, in S101, after the comparison value X is calculated, the paging weights of each carrier group may be accumulated one by one starting from the carrier group 0 with an index of 0. Assuming that the accumulated value is greater than the comparison value X when the accumulation is performed to the carrier group 2, it may be determined that the carrier group 2 is the target carrier group.

In some embodiments, the paging message may be transmitted on all carriers in the target carrier group. Accordingly, after S102, the method may further include receiving the paging message on the selected paging carrier.

That is, the network pages the UE on all carriers in the target carrier group, and the UE selects a more appropriate paging carrier to receive the paging message from the target carrier group in real time according to its current environment and status.

For example, in the target carrier group determined in S101, the UE may select an appropriate carrier for paging monitoring according to its own environment or received signal quality, such as a current coverage level or an actually measured RSRP. That is, the UE may select from the target carrier group a carrier whose paging parameter configuration is appropriate for the current situation of the UE.

In some embodiments, S102 may include: measuring channel quality, and determining that a carrier in the target carrier group whose channel quality threshold is closest to the measured channel quality is the paging carrier, wherein carriers in the plurality of carrier groups correspond to channel quality thresholds in one-to-one correspondence.

Specifically, the channel quality may be represented by RSRP, and accordingly, the channel quality threshold is an RSRP threshold.

More specifically, the one-to-one correspondence between the carriers in the carrier groups and the channel quality thresholds may be indicated in advance by the paging configuration information.

For example, each carrier in the carrier group may correspond to an RSRP threshold which may be pre-configured by the network and delivered through a broadcast message. The broadcast message may be a System Information Block (SIB) message, or a Master Information Block (MIB) message.

For another example, the measured channel quality may be assessed through RSRQ or channel state information.

Further, after performing S101 to determine the target carrier group, the UE may compare the actually measured RSRP value with the corresponding RSRP thresholds of the carriers in the target carrier group configured by the network, and select the carrier corresponding to the RSRP threshold closest to the RSRP value actually measured by the UE in the target carrier group to monitor the paging message.

The UE may select any carrier in the cell to measure the channel quality. For example, the UE may perform RSRP measurement on an anchor carrier in the cell.

Alternatively, S102 may include: determining that a carrier in the target carrier group whose coverage level matches the current coverage level is the paging carrier, wherein the carriers in the plurality of carrier groups correspond to coverage levels in one-to-one correspondence.

Specifically, the current coverage level of the UE may be determined according to the measured RSRP.

More specifically, the one-to-one correspondence between the carriers in the carrier group and the coverage levels may be indicated in advance by the paging configuration information.

For example, each carrier in the carrier group corresponds to a coverage level, which may be pre-configured by the network and delivered through a broadcast message. The broadcast message may be an SIB message or an MIB message.

Further, after performing S101 to determine the target carrier group, the UE may select a carrier corresponding to the coverage level in the target carrier group to monitor the paging message according to the current coverage level.

In some embodiments, in addition to the current coverage level and channel quality, the UE may select an appropriate carrier from the target carrier group as the paging carrier based on factors such as a moving speed, battery power or energy consumption of the UE.

For example, if the current energy consumption of the UE is relatively low, a carrier with a longer paging cycle may be selected from the target carrier group as the paging carrier to perform paging monitoring.

From above, embodiments enable to select a carrier corresponding to appropriate paging parameter configuration for paging monitoring according to the UE's own state and environment, which is conducive to improving working efficiency of an NB-IOT system. Specifically, by pre-configuring a plurality of carrier groups and configuring corresponding paging weights for each carrier group, the UE can uniquely determine a carrier group, i.e., a target carrier group based on a UE identity, the paging weights of the plurality of carrier groups and relevant broadcasting parameters (such as common paging parameters). Further, after determining the target carrier group, the UE may select an appropriate carrier in the target carrier group as the paging carrier according to its own actual situation, and monitor paging on the paging carrier.

Further, the paging parameter configurations of the plurality of carrier groups are the same, the non-common paging configuration parameters of different carriers in the carrier group are different, one carrier group corresponds to one paging weight, and carrier overlap may exist between carrier groups.

Further, the network transmits paging on all carriers in the target carrier group, and the UE monitors paging on a specific carrier in the target carrier group.

Figure 4:
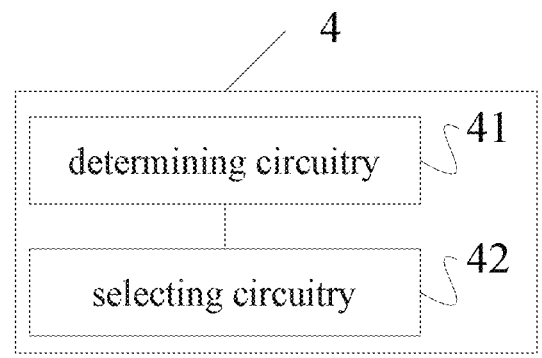
FIG. 4 is a structural diagram of an apparatus for determining a paging carrier according to an embodiment.

FIG. 4 is a structural diagram of an apparatus for determining a paging carrier according to an embodiment. Those skilled in the art could understand that the apparatus 4 for determining a paging carrier may be applied to perform the method as shown in FIG. 1 to FIG. 3.

Referring to FIG. 4, the apparatus 4 may include: a determining circuitry 41 configured to determine a target carrier group based on a UE identity, paging weights of a plurality of carrier groups and common paging parameters, wherein the common paging parameters correspond to thy: plurality of carrier groups, and each of the plurality of carrier groups is configured with a paging weight; and a selecting circuitry 42 configured to select the paging carrier from the target carrier group at least based on a current coverage level and/or measured channel quality.

Details of working principles and working modes of the apparatus 4 may be referred to relevant description of FIG. 1 to FIG. 3, and are not repeated here.

In some embodiments, the apparatus 4 may correspond to a chip with a paging function in a UE, or to a chip with a data processing function, such as a System-On-Chip (SOC) or a baseband chip, or to a chip module including a chip with a paging function in the UE, or to a chip module including a chip with a data processing function, or to the UE.

Figure 5:
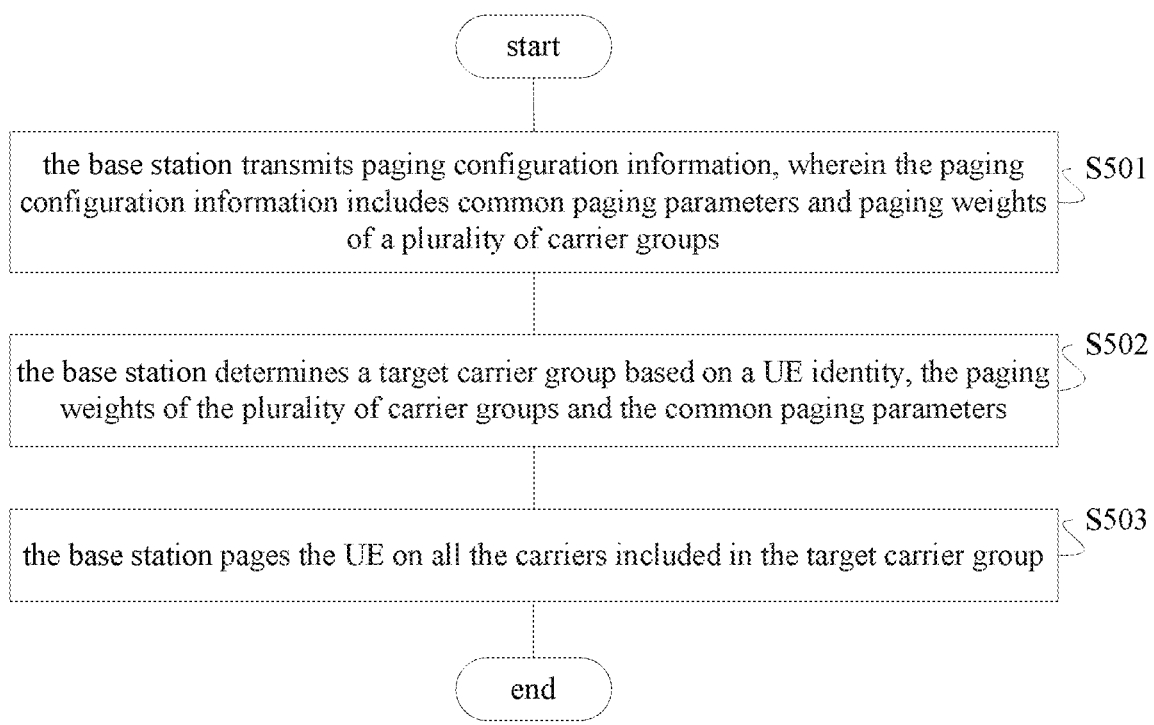
FIG. 5 is a flow chart of a paging method according to an embodiment.

FIG. 5 is a flow chart of a paging method according to an embodiment.

The paging method may be applied to a 5G system, such as a scenario of realizing paging configuration in a carrier level in NB-IOT.

The method may be performed by a network side, such as by a base station on the network side. The base station may cooperate in paging with a UE that is capable of realizing paging configuration in a carrier level in the future.

In some embodiments, the method provided by following steps S501 to S503 may be performed by a chip with a paging function in a network device or by a baseband chip in the network device.

Specifically, referring to FIG. 5, the method in the embodiment may include S501, S502 and S503.

In S501, the base station transmits paging configuration information, wherein the paging configuration information includes common paging parameters and pa ng weights of a plurality of carrier groups.

In S502, the base station determines a target carrier group based on a UE identity, the paging weights of the plurality of carrier groups and the common paging parameters.

In S503, the base station pages the UE on all the carriers included in the target carrier group.

Those skilled in the art could understand that S501 to S503 may be regarded as steps corresponding to S101 and S102 of the above method as shown in FIG. 1, and the two are complementary in specific implementation principles and logic. Therefore, explanation of terms in the present embodiment may be referred to relevant description of the embodiment as shown in FIG. 1, and is not repeated here.

In some embodiments, S501 may be performed at any time after the UE accesses the cell. For example, the base station may transmit the paging configuration information to the accessed UE in a broadcast manner.

For example, the paging configuration information may be carried by SIB or MIB.

Further, S502 and S503 may be performed when the base station needs to page the UE.

In some embodiments, a number of carriers included in each of the plurality of carrier groups is the same, and paging parameter configurations of the plurality of carrier groups are consist it.

In some embodiments, for each of the plurality of carrier groups, non-common paging parameters corresponding to at least a portion of carriers included in the carrier group are different from non-common paging parameters corresponding to other carriers in the carrier group.

In some embodiments, there is carrier overlap between at least a portion of the plurality of carrier groups.

In some embodiments, for carriers overlapped among the plurality of carrier groups; non-common paging parameters corresponding to the overlapped carriers in different carrier groups are different.

In some embodiments; there is no carrier overlap among the plurality of carrier groups.

In some embodiments, S502 includes: calculating a comparison value based on the HE identity, the paging weights of the plurality of carrier groups and the common paging parameters; and from a carrier group with a smallest index number among the plurality of carrier groups, accumulating the paging weight of the carrier group, and based on that an accumulated value is greater than the comparison value; determining that the carrier group corresponding to the last accumulated paging weight is the target carrier group.

In some embodiments, the comparison value is calculated based on a following formula:

$$X = \mathrm{floor}(UE\_ID/(N \times N_s)) \bmod W,$$

where X is the comparison value, the floor( ) is a round-down function, UE_ID is the UE identity, N is a number of paging frames included in a single DRX cycle, $N_s$ is a number of paging occasions included in a single paging frame, W is a sum of the paging weights of the plurality of carrier groups, and mod is a modulo operation.

In some embodiments, the paging configuration information further includes channel quality thresholds and/or coverage levels corresponding to the carriers in the plurality of carrier groups.

From above, the base station adopting the solutions in the embodiments of the present disclosure pages the UE on all carriers in the target carrier group. Accordingly, the UE can select an appropriate paging carrier in the target carrier group to perform paging monitoring according to its own actual situation. A system may be more flexible, and the UE may accurately and timely receive paging from the base station. Therefore, it is possible to implement paging under carrier-level paging configuration.

Figure 6:
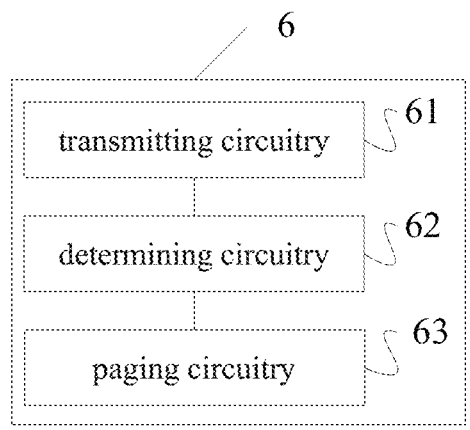
FIG. 6 is a structural diagram of a paging apparatus according to an embodiment.

FIG. 6 is a structural diagram of a paging apparatus according to an embodiment. Those skilled in the art could understand that the paging apparatus 6 may be applied to perform the method as shown in FIG. 5.

Referring to FIG. 6, the paging apparatus 6 may include: a transmitting circuitry 61 configured to transmit paging configuration information, wherein the paging configuration information includes common paging parameters and paging weights of a plurality of carrier groups; a determining circuitry 62 configured to determine a target carrier group based on a UE identity, the paging weights of the plurality of carrier groups and the common paging parameters; and a paging circuitry 63 configured to page the UE on all the carriers included in the target carrier group.

Details of working principles and working modes of the paging apparatus 6 may be referred to relevant description of FIG. 5, and are not repeated here.

In some embodiments, the paging apparatus 6 may correspond to a chip with a paging function in a network device, or to a chip with a data processing function, such as an SOC or a baseband chip, or to a chip module including a chip with a paging function in the network device, or to a chip module including a chip with a data processing function, or to the network device.

In some embodiments, each module/unit of each apparatus and product described in the above embodiments may be a software module/unit or a hardware module/unit, or may be a software module/unit in part, and a hardware module/unit in part.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a storage medium having computer instructions stored therein is provided, wherein when the computer instructions are executed, the above method as shown in FIG. 1 to FIG. 3 or the above method as shown in FIG. 5 is performed. The storage medium may be a computer-readable storage medium, such as a non-volatile memory or a non-transitory memory. The storage medium may include a ROM, a RAM, a magnetic disk or an optical disk.

In an embodiment of the present disclosure, a terminal including a memory and a processor is provided, wherein the memory has computer instructions stored therein, and when the processor executes the computer instructions, the above method as shown in FIG. 1 to FIG. 3 is performed. The terminal may be a UE, such as a UE in an NB-IOT system. Alternatively, the terminal may include the apparatus 4 as shown in FIG. 4.

In an embodiment of the present disclosure, a base station including a memory and a processor is provided, wherein the memory has computer instructions stored therein, and when the processor executes the computer instructions, the above method as shown in FIG. 5 is performed. The base station may be a base station in an NB-IOT system. Alternatively, the base station may include the apparatus 6 as shown in FIG. 6.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for determining a paging carrier, comprising:
   determining a target carrier group based on a User Equipment (UE) identity, paging weights of a plurality of carrier groups and common paging parameters, wherein the common paging parameters correspond to the plurality of carrier groups, and each of the plurality of carrier groups is configured with a paging weight; and
   selecting the paging carrier from the target carrier group at least based on a current coverage level and/or measured channel quality.

2. The method according to claim 1, wherein a number of carriers included in each of the plurality of carrier groups is the same, and paging parameter configurations of the plurality of carrier groups are consistent.

3. The method according to claim 2, wherein for each of the plurality of carrier groups, non-common paging parameters corresponding to at least a portion of carriers included in the carrier group are different from non-common paging parameters corresponding to other carriers in the carrier group.

4. The method according to claim 1, wherein there is carrier overlap between at least a portion of the plurality of carrier groups, or there is no carrier overlap among the plurality of carrier groups.

5. The method according to claim 4, wherein for carriers overlapped among the plurality of carrier groups, non-common paging parameters corresponding to the overlapped carriers in different carrier groups are different.

6. The method according to claim 1, wherein said determining a target carrier group based on a UE identity, paging weights of a plurality of carrier groups and common paging parameters comprises:
   calculating a comparison value based on the UE identity, the paging weights of the plurality of carrier groups and the common paging parameters; and
   from a carrier group with a smallest index number among the plurality of carrier groups, accumulating the paging weight of the carrier group, and based on that an accumulated value is greater than the comparison value, determining that the carrier group corresponding to the last accumulated paging weight is the target carrier group.

7. The method according to claim 6, wherein the comparison value is calculated based on a following formula:

$$X = \text{floor}(UE\_ID/(N \times N_S)) \bmod W,$$

where X is the comparison value, the floor ( ) is a round-down function, UE_ID is the UE identity, N is a number of paging frames included in a single DRX cycle, $N_s$ is a number of paging occasions included in a single paging frame, W is a sum of the paging weights of the plurality of carrier groups, and mod is a modulo operation.

8. The method according to claim 1, wherein a paging message is transmitted on all carriers in the target carrier group.

9. The method according to claim 8, further comprising:
   receiving the paging message on the selected paging carrier.

10. The method according to claim 1, wherein said selecting the paging carrier from the target carrier group at least based on a current coverage level and/or measured channel quality comprises:
    measuring channel quality, and determining that a carrier in the target carrier group whose channel quality threshold is closest to the measured channel quality is the paging carrier, wherein carriers in the plurality of carrier groups correspond to channel quality thresholds in one-to-one correspondence; and/or determining that a carrier in the target carrier group whose coverage level matches the current coverage level is the paging carrier, wherein the carriers in the plurality of carrier groups correspond to coverage levels in one-to-one correspondence.

11. The method according to claim 10, further comprising:

receiving paging configuration information, wherein the paging configuration information comprises the common paging parameters, the paging weights of the plurality of carrier groups, and the channel quality thresholds and/or the coverage levels corresponding to the carriers in the plurality of carrier groups.

12. A non-transitory storage medium storing one or more programs, the one or more programs comprising computer instructions, which, when executed by a processor, cause the processor to:

determine a target carrier group based on a User Equipment (UE) identity, paging weights of a plurality of carrier groups and common paging parameters, wherein the common paging parameters correspond to the plurality of carrier groups, and each of the plurality of carrier groups is configured with a paging weight; and select a paging carrier from the target carrier group at least based on a current coverage level and/or measured channel quality.

13. A terminal, comprising a memory and a processor, wherein the memory stores one or more programs, the one or more programs comprising computer instructions, which, when executed by the processor, cause the processor to:

determine a target carrier group based on a User Equipment (UE) identity, paging weights of a plurality of carrier groups and common paging parameters, wherein the common paging parameters correspond to the plurality of carrier groups, and each of the plurality of carrier groups is configured with a paging weight; and select a paging carrier from the target carrier group at least based on a current coverage level and/or measured channel quality.

14. The terminal according to claim 13, wherein a number of carriers included in each of the plurality of carrier groups is the same, and paging parameter configurations of the plurality of carrier groups are consistent.

15. The terminal according to claim 14, wherein for each of the plurality of carrier groups, non-common paging parameters corresponding to at least a portion of carriers included in the carrier group are different from non-common paging parameters corresponding to other carriers in the carrier group.

16. The terminal according to claim 13, wherein there is carrier overlap between at least a portion of the plurality of carrier groups, or there is no carrier overlap among the plurality of carrier groups.

17. The terminal according to claim 16, wherein for carriers overlapped among the plurality of carrier groups, non-common paging parameters corresponding to the overlapped carriers in different carrier groups are different.

18. The terminal according to claim 13, wherein the processor is further caused to:

calculate a comparison value based on the UE identity, the paging weights of the plurality of carrier groups and the common paging parameters; and from a carrier group with a smallest index number among the plurality of carrier groups, accumulate the paging weight of the carrier group, and based on that an accumulated value is greater than the comparison value, determine that the carrier group corresponding to the last accumulated paging weight is the target carrier group.

19. The terminal according to claim 18, wherein the comparison value is calculated based on a following formula:

$$X = \text{floor}(UE\_ID/(N \times N_s)) \bmod W,$$

where X is the comparison value, the floor ( ) is a round-down function, UE_ID is the UE identity, N is a number of paging frames included in a single DRX cycle, $N_s$ is a number of paging occasions included in a single paging frame, W is a sum of the paging weights of the plurality of carrier groups, and mod is a modulo operation.

20. The terminal according to claim 13, wherein a paging message is transmitted on all carriers in the target carrier group.

* * * * *